May 5, 1953  A. H. B. WALKER  2,637,769
MEANS FOR SUPPRESSING ARCING AT CONTACTS BREAKING
A DIRECT CURRENT INDUCTIVE CIRCUIT
Original Filed May 18, 1950

INVENTOR
ALEC HERVEY BENNETT WALKER,

BY Robert B Pearson
ATTORNEY

Patented May 5, 1953

2,637,769

UNITED STATES PATENT OFFICE 2,637,769

MEANS FOR SUPPRESSING ARCING AT CONTACTS BREAKING A DIRECT CURRENT INDUCTIVE CIRCUIT

Alec Hervey Bennett Walker, London, England, assignor to Westinghouse Brake and Signal Company, Limited, London, England Original application May 18, 1950, Serial No. 162,616. Divided and this application December 14, 1951, Serial No. 265,681. In Great Britain May 31, 1949

7 Claims. (Cl. 175—294)

This invention relates to means for suppressing arcing at contacts breaking an inductive electric current circuit.

When the current in an inductive circuit is interrupted, the energy stored in the magnetic field associated therewith has to be dissipated and, if no steps are taken to prevent it, this energy appears in the form of an arc discharge across the contacts at which the circuit is interrupted, with consequent damage to those contacts. Several methods of absorbing this energy so as to minimise arcing at the contacts are known of which examples are the connecting of a resistance and a condenser in series across the contacts, a non-linear resistor connected across the inductance or a rectifier so connected across the inductance that current can continue to flow in the circuit after the contact has opened. Such methods are open to the objection that the surge energy has to be dissipated in the spark quench device itself which leads to difficulties when the circuit has to be rapidly opened and closed, such as occurs in the operation of a rotary line finder switch in a telephone system, for the reason that the energy to be dissipated becomes quite considerable and demands that the spark quench devices be un-economically large.

When the inductive circuit comprises a relay, some previously known methods of arc suppression, especially the parallel connected rectifier mentioned above, have the added disadvantage that the release of the relay after the opening of the circuit is unduly delayed.

According to the invention a method of suppressing arcing at contacts breaking a current circuit comprising an inductive winding is characterised in that a rectifier is subjected to a reverse biassing voltage and is so connected that surge energy due to the breaking of the circuit is fed through the rectifier to the biassing source whenever the surge voltage exceeds a predetermined value.

Preferably the biassing source is the current source which supplies the circuit but it may be an independent source, for example, a battery.

The invention is illustrated by way of example in the accompanying drawing, Figures 1 to 6 of which show alternative circuits embodying the invention.

Figure 1:
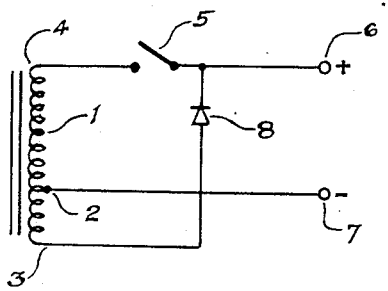

Referring now to Figure 1, a winding 1, which may, for example, be the operating winding of a relay or of an electro-magnet, has a tapping at a point 2 which is a predetermined number of turns from one end 3. The other end 4 of the winding 1 is connected through the contact 5 to be protected to one terminal 6 of a direct current source of supply while the tapping 2 is connected to the other terminal 7 of the source. The end 3 of the winding 1 is connected through a rectifier 8 to the live side of the contact 5 in such a manner that the rectifier 8 is under reverse stress and is biassed to the voltage of the supply. The winding is thus in the form of an auto-transformer and when the contact 5 is opened to break the circuit the surge voltage induced in the tapped portion will be proportional to that induced in the main portion, the proportion depending upon the ratio of turns. When the voltage induced in the tapped portion exceeds the voltage to which the rectifier is biassed, in this case the supply voltage, the rectifier will pass current, the surge energy will pass back into the supply circuit and the surge voltage induced in the main portion of the winding will accordingly be prevented from rising above a multiple of the supply voltage determined by the ratio of turns. It will be noted that the rectifier 8 does not itself have to absorb the surge power, it serves only to pass the power back to the source, where it is absorbed. The rectifier can therefore be of relatively small dimensions compared with surge absorbing rectifiers used in known circuits.

Figure 2:
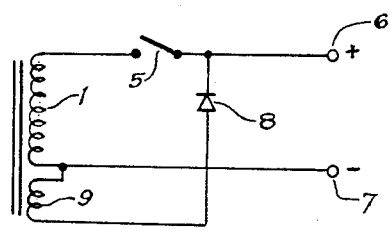

A modification of this arrangement if shown in Figure 2 wherein the tapped portion of the winding is replaced by an auxiliary winding 9, which should be coupled as closely as possible to the main winding 1.

Figure 3:
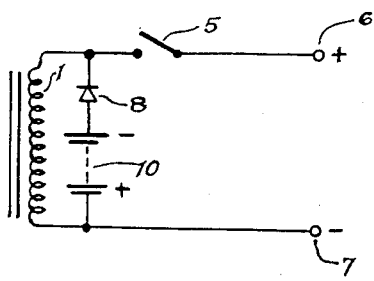
Figure 4:
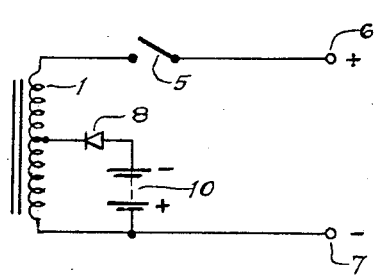

If desired the biassing source may be a battery, separate and distinct from the supply source. In this case the supply source may be applied across the whole winding 1, thus making maximum use of the winding space available, while the biassing battery is connected, in series with a rectifier 8, across a tapped portion or the whole of the winding, depending upon the value to which the surge voltage is to be limited. This arrangement is illustrated in Figure 3, wherein the terminals 6, 7 of the source of supply are connected to the two ends of the winding 1, the contact 5 being inserted in the circuit as before. Also connected across the winding 1 is the rectifier 8 in series with a battery 10. The battery and rectifier must be so poled that the battery cannot discharge through the winding and that the surge voltage, when it rises above that of the battery, causes the surge energy to pass through the rectifier into the battery, where it is absorbed. Figure 4 shows a variation of the arrangement shown in Figure 3 wherein the rectifier and battery are connected across only a portion of the winding 1.

Figure 5:
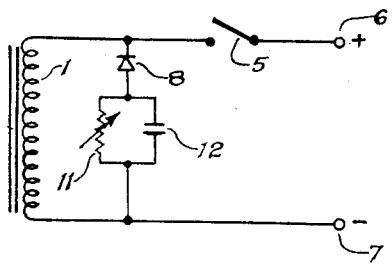

In a further modification, shown in Figure 5, there may be connected directly across the winding 1 a circuit comprising a rectifier 8 in series with a parallel connected resistance 11 and condenser 12, the rectifier being poled so that current from the supply source does not normally pass through the circuit when the contact 5 is closed. This arrangement is suitable for the protection of contacts which operate a number of times in quick succession. Every time the contact opens to break the circuit, the surge energy passes into the parallel circuit and charges the condenser 12. The condenser charge leaks away through the resistance 11 and the voltage which builds up across the condenser, which is the biassing voltage, depends upon the respective values of the condenser and the resistance and the rapidity of operation of the contact 5. It will be appreciated that, with this arrangement, at the initial breaking of the contact 5 the biassing voltage is zero so that the surge voltage is prevented from rising and there is a retarding effect upon the operation of the associated relay of which winding 1 is assumed to be the energising winding. This, however, is only very temporary and the required biassing voltage rapidly builds up in a time which also depends upon the relative values of the condenser and the resistance and the frequency of operation of the contact.

It sometimes occurs that the operating winding of a device, such as relay, may be energised with direct current of either polarity or with alternating current. In such cases the above-mentioned arrangements would evidently not work satisfactorily. To meet this requirement the arrangement of Figure 6 may be employed. In this arrangement a separate winding 13 is provided, tightly coupled to the operating winding 1 and connected through a full wave rectifier 14 to a biassing battery 10. In an alternative arrangement (not shown) to that of Figure 6 the rectifier may be connected directly across the operating winding or a portion thereof. With such an arrangement the biassing voltage is of the correct polarity and the battery will receive the surge energy whichever polarity is applied to the winding at the time the circuit is broken. With this alternative arrangement, however, the battery or other biassing source must be independent of the source from which the operating winding is energised.

Figure 6:
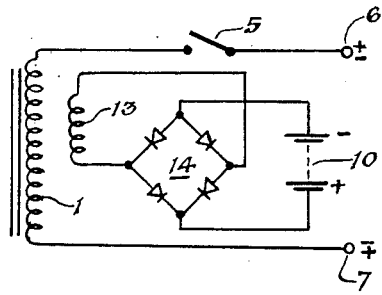

The arrangement of Figure 6 is also suitable for suppressing arcing in cases in which the winding 1 is operated by alternating current supplied to the terminals 6, 7.

It will be understood that the battery employed to supply the biassing voltage as shown in Figures 3, 4 and 6 may be replaced by an equivalent biassing source such for example as a condenser connected in parallel with a resistance and charged from an independent source or by the rectified surges themselves as in the arrangement shown in Figure 5.

It will be seen that in each of the above described embodiments of the invention the source used to bias the rectifier also acts as a reservoir which absorbs the surge energy which is generated when the contact 5 is opened to break the inductive circuit as soon as the surge voltage rises sufficiently to overcome the voltage to which the rectifier is biassed.

This application is a division of application Serial No. 162,616, filed May 18, 1950, which is now abandoned.

What I claim is:

1. In combination with a source of direct current, a pair of cooperating contact members, and an inductive circuit connected in series with said contact members across said source; an arc suppressing arrangement comprising, a rectifier, and a battery connected in series with said rectifier directly across the inductive circuit, the rectifier being so poled as to oppose the flow therethrough of current from said battery and from the source of direct current, whereby the surge energy due to the opening of said contact members passes into and is absorbed by the battery when the voltage of the surge exceeds a value determined by the battery.

2. In combination with a source of direct current, a pair of cooperating contact members, and an inductive circuit connected in series with said contact members across said source, an arc suppressing arrangement comprising, a rectifier; and a biassing battery connected in series with said rectifier directly across at least part of said inductive winding, said rectifier being so poled as to oppose the flow therethrough of current from the biassing battery and from said source whereby the surge energy generated when said contact members are opened flows into and is absorbed by said battery when the voltage of the surge exceeds a value determined by the biassing battery.

3. In combination with a source of direct current, a pair of cooperating contact members and an inductive circuit connected in series with said contact members across said source; an arc suppressing arrangement comprising a rectifier; electric energy absorption means for permanently applying a constant direct current voltage across said rectifier which is so poled as to oppose the flow therethrough of current from said means; circuit means for passing into said first mentioned means through said rectifier surge energy induced in said inductive circuit when said contact members are opened when the voltage of said surge energy exceeds a value determined by the magnitude of said constant direct current voltage.

4. In combination with a source of direct current, a pair of cooperating contact members, and a first length of inductive winding connected in series with said contact members across said source; an arc suppressing arrangement comprising, a second length of inductive winding tightly coupled to and having fewer turns than said first length of inductive winding; and a rectifier connected in series with said second length of inductive winding across said source and so poled as to oppose the flow therethrough of current from said source, said second length of inductive winding being so wound that surge energy induced therein when said contact members are opened flows through said rectifier into and is absorbed by said source when the voltage of the surge energy exceeds a value determined by the voltage of said source and by the degree of coupling between said first and second lengths.

5. In combination with a source of direct current, a pair of cooperating contact members, an inductive winding having one end connected in series with said contact members to a first terminal of said source and a tapping connected to a second terminal of said source; an arc suppressing arrangement comprising, a rectifier connected between the other end of the inductive winding and said first terminal and so poled as to oppose the flow therethrough of current from said source, whereby the surge energy due to the opening of the contact members flows through said rectifier into and is absorbed by said source when the voltage of the surge energy exceeds a value determined by the voltage of said source and by the position of the tapping.

6. In combination with a source of direct current, a pair of cooperating contact members and a first length of inductive winding connected in series with said contact members across said source, an arc suppressing arrangement comprising, a second length of inductive winding tightly coupled to said first length; a full wave rectifier comprising a plurality of half wave rectifier elements connected across said second length of inductive winding; and a biasing battery so connected as to put said rectifier elements under reverse voltage stress and to absorb direct current energy passed by said rectifier elements when said contact members are opened to terminate the flow of direct current through said first length of inductive winding.

7. In combination with a source of direct current, a pair of cooperating contact members and a first length of inductive winding connected in series with said contact members across said source, an arc suppressing arrangement comprising, a second length of inductive winding tightly coupled to said first length; a full wave rectifier comprising a plurality of half wave rectifier elements bridge connected and having alternating current input terminals and direct current output terminals, said input terminals being connected across said second length of inductive winding; and a biassing battery connected across said output terminals in such a manner as to put said rectifier elements under reverse voltage stress, whereby electrical energy induced in said second length of inductive winding upon the opening of said contact members flows into said battery and is absorbed thereby when the voltage of said energy exceeds that of said battery.

ALEC HERVEY BENNETT WALKER.

References Cited in the file of this patent

UNITED STATES PATENTS

| Number | Name | Date |
|---|---|---|
| 2,339,858 | Hufnagel | Jan. 25, 1944 |

FOREIGN PATENTS

| Number | Country | Date |
|---|---|---|
| 728,775 | France | July 11, 1932 |
| 759,031 | France | Jan. 27, 1934 |